US012625730B2

(12) United States Patent
Horie et al.

(10) Patent No.: US 12,625,730 B2
(45) Date of Patent: May 12, 2026

(54) OBJECT MANAGEMENT FOR MANAGING RUNTIME OVERHEAD

(71) Applicant: International Business Machines Corporation, Armonk, NY (US)

(72) Inventors: Michihiro Horie, Ageo City (JP); Kazunori Ogata, Soka (JP)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 18/190,575

(22) Filed: Mar. 27, 2023

(65) Prior Publication Data

US 2024/0330057 A1 Oct. 3, 2024

(51) Int. Cl.
| | |
|---|---|
| *G06F 9/50* | (2006.01) |
| *G06F 8/75* | (2018.01) |
| *G06F 11/3604* | (2025.01) |
| *G06F 12/02* | (2006.01) |

(52) U.S. Cl.
CPC .......... *G06F 9/5022* (2013.01); *G06F 9/5016* (2013.01); *G06F 9/5072* (2013.01); *G06F 11/3604* (2013.01); *G06F 12/02* (2013.01); *G06F 12/023* (2013.01); *G06F 8/75* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 6,275,916 B1 * | 8/2001 | Weldon, Jr. ........... | G06F 9/4488 |
| | | | 711/170 |
| 6,505,344 B1 | 1/2003 | Blais et al. | |
| 6,675,378 B1 | 1/2004 | Schmidt | |
| 7,380,091 B2 * | 5/2008 | Bayt ..................... | G06F 3/0673 |
| | | | 711/170 |
| 7,685,586 B1 | 3/2010 | Foley | |
| 9,753,850 B1 * | 9/2017 | Luck ................... | G06F 12/0253 |
| 10,223,256 B1 * | 3/2019 | Schneider .............. | G06F 16/00 |
| 2008/0010327 A1 * | 1/2008 | Steensgaard ........ | G06F 12/0253 |

(Continued)

OTHER PUBLICATIONS

Choi et al., "Escape Analysis for Java," Oopsla'99, ACM SIGPLAN Notices, vol. 34, Issue 10, Oct. 1999, 19 pages. https://doi.org/10.1145/320385.320386.

(Continued)

*Primary Examiner* — Abu Zar Ghaffari
(74) *Attorney, Agent, or Firm* — Yee & Associates, P.C.

(57) ABSTRACT

A computer implemented method manages a memory. A number of processor units determines a creation of an object in a program. The number of processor units determines a set of uses of the object in the program. The number of processor units add an allocation program code to allocate memory to the object in an off heap region in memory in response to the object not being within a call chain and not being assigned to a global variable. The number of processor units add a deallocation program code to deallocate the memory after each possible last use in a set of possible last uses of the object in the uses of the object in the program in response to the object not being within the call chain and not being assigned to the global variable. Additionally, a computer system and a computer program product for managing memory are provided.

20 Claims, 6 Drawing Sheets

(56)     References Cited

U.S. PATENT DOCUMENTS

| | | | | | |
|---|---|---|---|---|---|
| 2009/0013320 | A1* | 1/2009 | Peterson | ................. | G06F 9/449 |
| | | | | | 718/1 |
| 2011/0289263 | A1* | 11/2011 | McWilliams | ....... | G06F 12/0802 |
| | | | | | 711/E12.008 |
| 2012/0271866 | A1* | 10/2012 | Lucco | ................. | G06F 12/0253 |
| | | | | | 707/819 |
| 2013/0054925 | A1* | 2/2013 | Hsia | .................... | G06F 11/3604 |
| | | | | | 711/170 |
| 2015/0236724 | A1* | 8/2015 | Reinart | ............ | H03M 13/3761 |
| | | | | | 714/774 |
| 2016/0291942 | A1* | 10/2016 | Hutchison | ............... | G06F 8/311 |
| 2017/0017472 | A1* | 1/2017 | He | .......................... | G06F 8/433 |
| 2019/0354471 | A1* | 11/2019 | Yoshimura | .......... | G06F 12/0223 |
| 2021/0149788 | A1* | 5/2021 | Downie | ............. | G06F 11/3604 |
| 2021/0191859 | A1* | 6/2021 | Stephens | ............ | G06F 12/0261 |
| 2023/0350802 | A1* | 11/2023 | Cimadamore | ...... | G06F 12/0246 |
| 2024/0103821 | A1* | 3/2024 | Sockalingasamy | ..... | G06F 8/433 |

OTHER PUBLICATIONS

Choi et al., "Stack Allocation and Synchronization Optimizations for Java Using Escape Analysis," ACM Transactions on Programming Languages and Systems, vol. 25, No. 6, Nov. 2003, 35 pages.

Ericson, "Mitigating garbage collection in Java microservices," Independent Thesis, Mid Sweden University, Department of Information Systems and Technology, Master of Science in Computer Engineering, Jun. 14, 2021, 78 pages. http://www.diva-portal.org/smash/record.jsf?pid=diva2%3A1567934&dswid=6183.

Krill, "Micronaut framework promises low-overhead microservices," InfoWorld, Copyright 2022, IDG Communications, Inc., May 23, 2018, 3 pages. https://www.infoworld.com/article/3275787/micronaut-framework-promises-low-overhead-microservices.html.

No Author, "GrallVM, High Performance. Cloud Native. Polyglot", Mar. 20, 2023, 3 Pages.

No Author, "Knative-Quarkus-Bench Project", IBM, Jan. 20, 2023, 5 Pages.

No Author, "Supersonic/Subatomic/Java", Kubernetes Native Java, Quarkus, Mar. 22, 2023, 10 Pages.

* cited by examiner

COMPUTING ENVIRONMENT
100

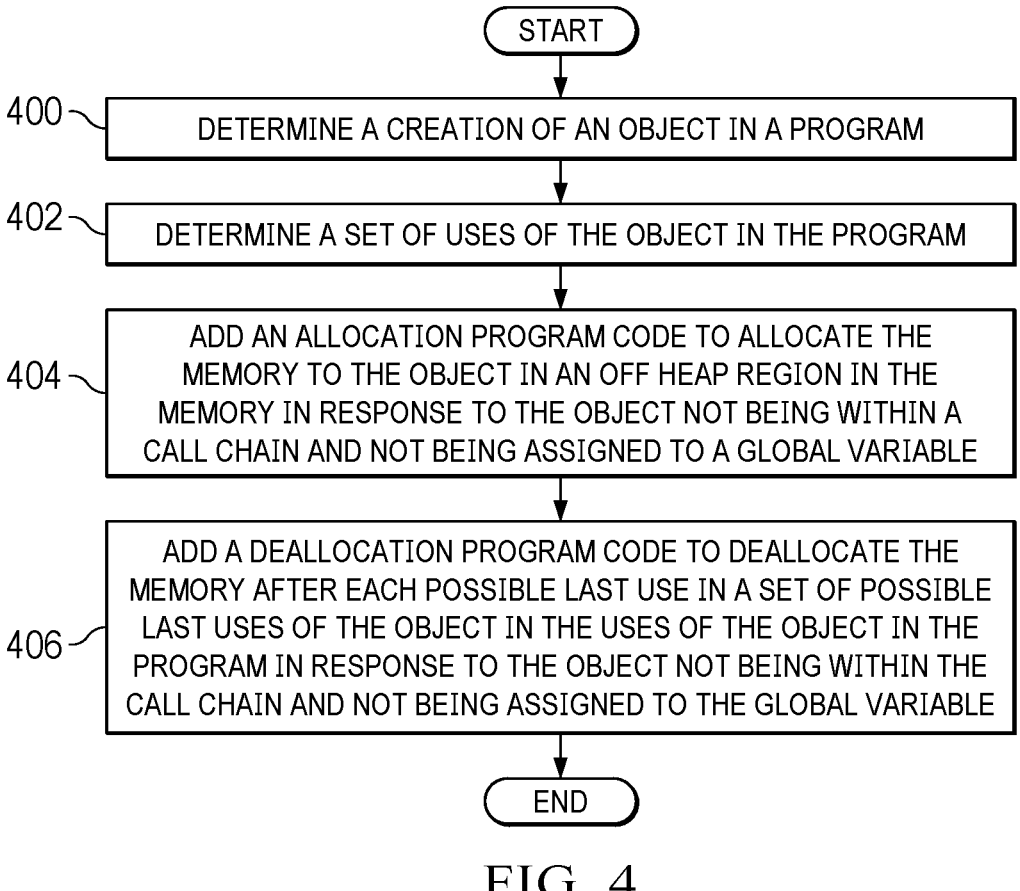

START

400 — DETERMINE A CREATION OF AN OBJECT IN A PROGRAM

402 — DETERMINE A SET OF USES OF THE OBJECT IN THE PROGRAM

404 — ADD AN ALLOCATION PROGRAM CODE TO ALLOCATE THE MEMORY TO THE OBJECT IN AN OFF HEAP REGION IN THE MEMORY IN RESPONSE TO THE OBJECT NOT BEING WITHIN A CALL CHAIN AND NOT BEING ASSIGNED TO A GLOBAL VARIABLE

406 — ADD A DEALLOCATION PROGRAM CODE TO DEALLOCATE THE MEMORY AFTER EACH POSSIBLE LAST USE IN A SET OF POSSIBLE LAST USES OF THE OBJECT IN THE USES OF THE OBJECT IN THE PROGRAM IN RESPONSE TO THE OBJECT NOT BEING WITHIN THE CALL CHAIN AND NOT BEING ASSIGNED TO THE GLOBAL VARIABLE

END

FIG. 4

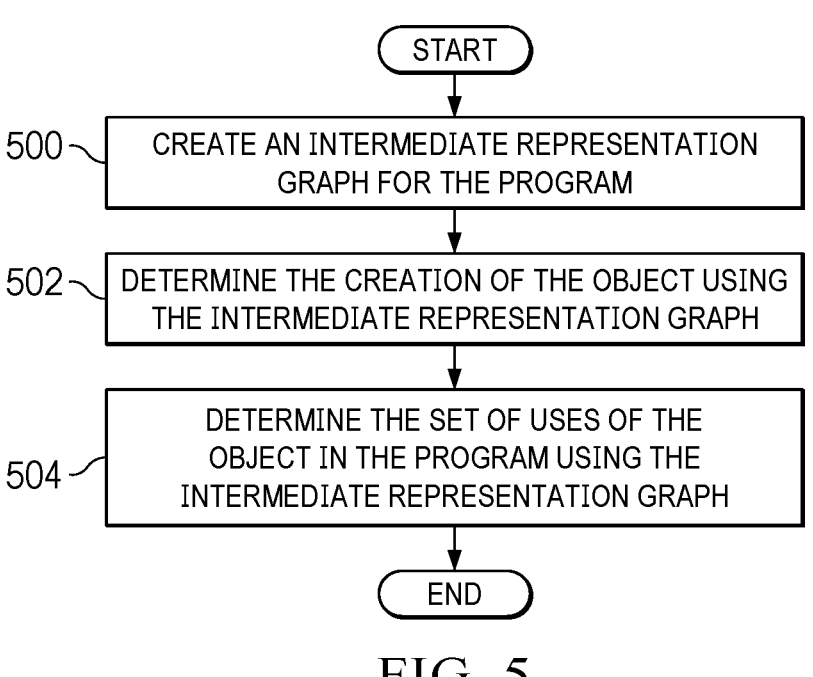

START

500 — CREATE AN INTERMEDIATE REPRESENTATION GRAPH FOR THE PROGRAM

502 — DETERMINE THE CREATION OF THE OBJECT USING THE INTERMEDIATE REPRESENTATION GRAPH

504 — DETERMINE THE SET OF USES OF THE OBJECT IN THE PROGRAM USING THE INTERMEDIATE REPRESENTATION GRAPH

END

FIG. 5

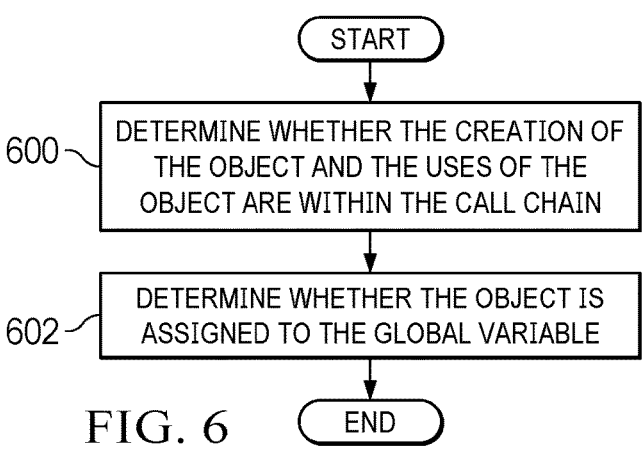

START

600   DETERMINE WHETHER THE CREATION OF THE OBJECT AND THE USES OF THE OBJECT ARE WITHIN THE CALL CHAIN

602   DETERMINE WHETHER THE OBJECT IS ASSIGNED TO THE GLOBAL VARIABLE

END

FIG. 6

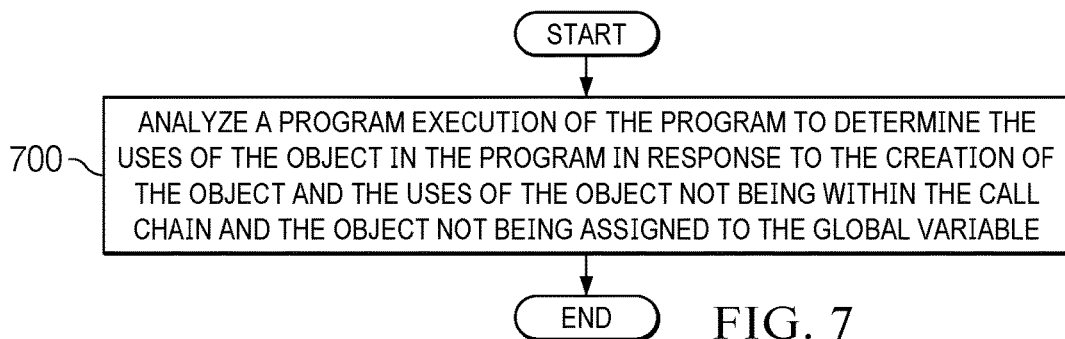

START

700   ANALYZE A PROGRAM EXECUTION OF THE PROGRAM TO DETERMINE THE USES OF THE OBJECT IN THE PROGRAM IN RESPONSE TO THE CREATION OF THE OBJECT AND THE USES OF THE OBJECT NOT BEING WITHIN THE CALL CHAIN AND THE OBJECT NOT BEING ASSIGNED TO THE GLOBAL VARIABLE

END   FIG. 7

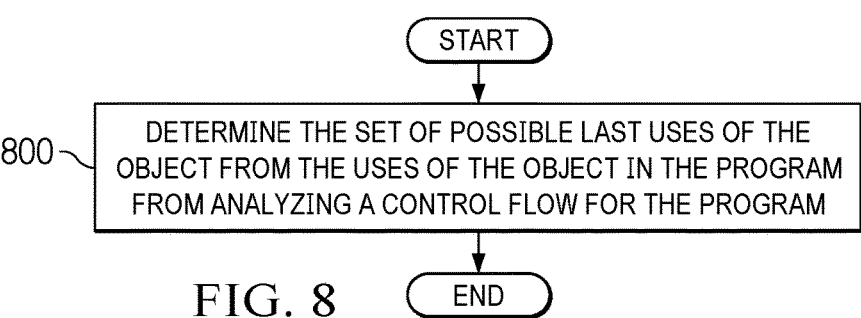

START

800   DETERMINE THE SET OF POSSIBLE LAST USES OF THE OBJECT FROM THE USES OF THE OBJECT IN THE PROGRAM FROM ANALYZING A CONTROL FLOW FOR THE PROGRAM

FIG. 8   END

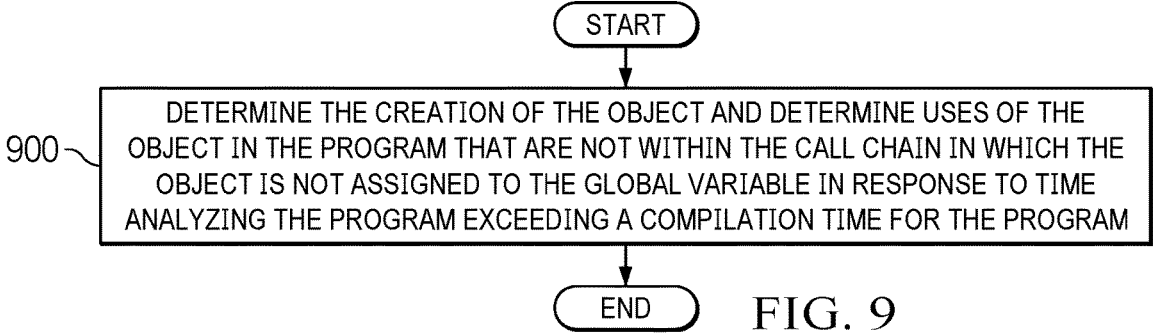

START

900   DETERMINE THE CREATION OF THE OBJECT AND DETERMINE USES OF THE OBJECT IN THE PROGRAM THAT ARE NOT WITHIN THE CALL CHAIN IN WHICH THE OBJECT IS NOT ASSIGNED TO THE GLOBAL VARIABLE IN RESPONSE TO TIME ANALYZING THE PROGRAM EXCEEDING A COMPILATION TIME FOR THE PROGRAM

END   FIG. 9

1000

OBJECT MANAGEMENT FOR MANAGING RUNTIME OVERHEAD

BACKGROUND

The disclosure relates generally to an improved computer system and more specifically to computer memory management.

Java programs are designed to run on a Java virtual machine. The Java virtual machine executes the bytecode for the program and manages the memory and resources for the program. When executing a job program, Java virtual machine loads the necessary classes and runs the bytecode for the program. Class loading is a process in which the Java virtual machine loads classes needed for executing the Java program. A Java virtual machine uses a hierarchical class loading system in which classes are loaded as needed by the program.

In executing a job program, the Java virtual machine interprets the bytecodes in the program. If a portion of the bytecode is executed frequently, the Java virtual machine can identify that portion of the bytecode as a hotspot and compile that bytecode into machine code using just-in-time compilation. As result, faster execution times can occur for that portion of the bytecode in the program. This type of compilation can be used for formants critical sections such as loops are frequently called methods.

In some cases, static compilation can be used for Java programs. This type of compilation has been increasing the used with microservices and serverless applications. With static compilation, executable machine code is generated from the source code. This executable code includes all of the code and resources needed to run the program. As result, an intermediate runtime environment such as a Java virtual machine is unnecessary.

SUMMARY

According to one illustrative embodiment, a computer implemented method manages a memory. A number of processor units determine a creation of an object in a program. The number of processor units determine a set of uses of the object in the program. The number of processor units add an allocation program code to allocate the memory to the object in an off heap region in the memory in response to the object not being within a call chain and not being assigned to a global variable. The number of processor units add a deallocation program code to deallocate the memory after each possible last use in a set of possible last uses of the object in the uses of the object in the program in response to the object not being within the call chain and not being assigned to the global variable. According to other illustrative embodiments, a computer system and a computer program product for managing memory are provided.

BRIEF DESCRIPTION OF THE DRAWINGS

FIG. 4 is a flowchart of a process for managing memory in accordance with an illustrative embodiment;

FIG. 5 is a flowchart of a process for analyzing a program in accordance with an illustrative embodiment;

FIG. 6 is a flowchart of a process for determining whether an object is suitable for memory management in accordance with an illustrative embodiment;

FIG. 7 is a flowchart of process for determining uses for an object in accordance with an illustrative embodiment;

FIG. 8 is a flowchart of a process for determining a set of last possible uses for an object in accordance with an illustrative embodiment;

FIG. 9 is an illustration of a flowchart of a process for determining analysis of the program for memory management in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
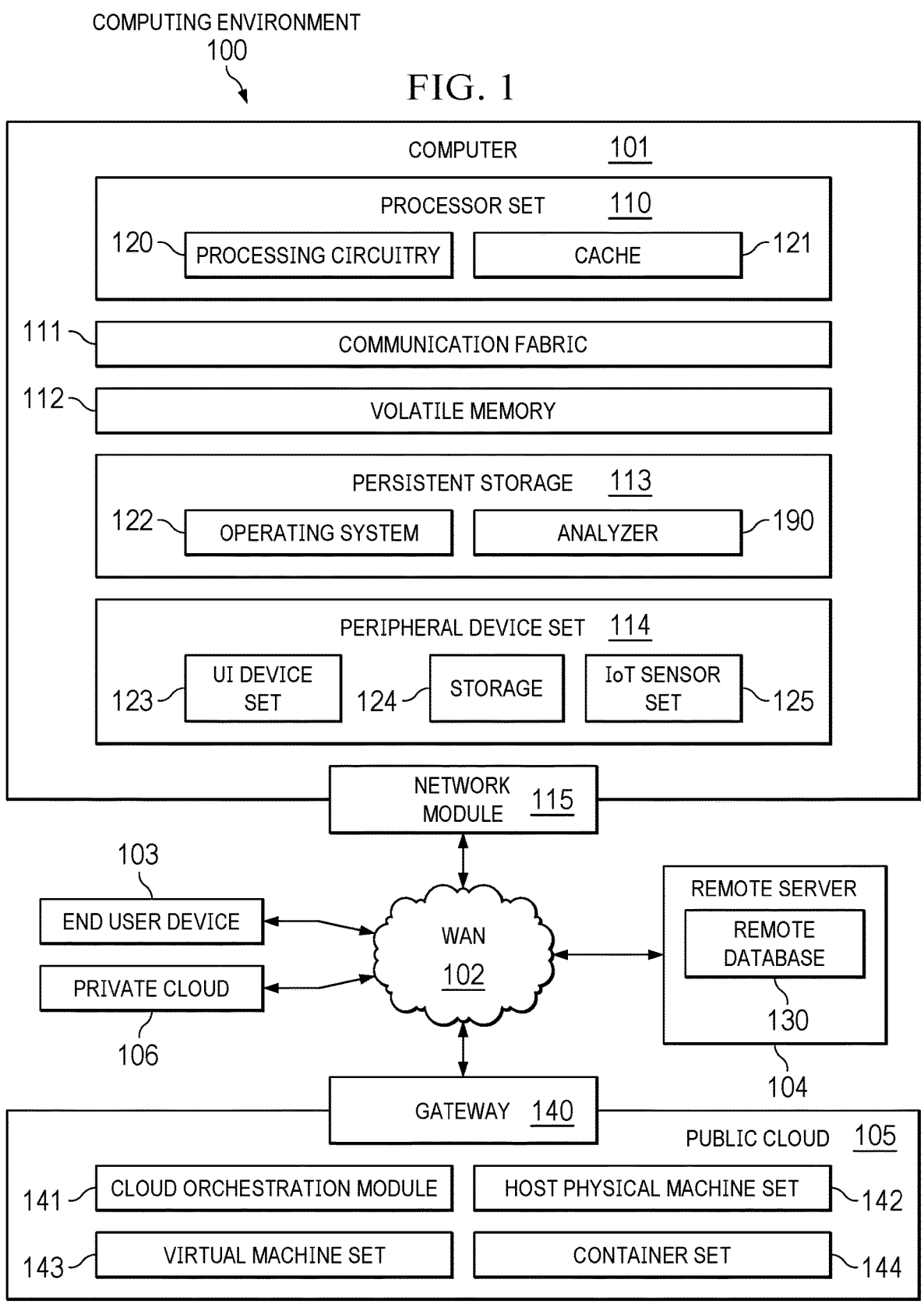
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as analyzer 190. In this example, analyzer 190 can be used to analyze program code to optimize memory management of objects using garbage collection. Analyzer 190 can be used to reduce the garbage collection overhead through selective allocation of objects to keep regions in the memory. In addition to analyzer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and analyzer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in analyzer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in analyzer 190 includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative examples recognize and take into account a number of different considerations as described herein. For example, with the use of static compilation, a faster start in program execution can occur as compared to current execution of Java code for program using a Java virtual machine. With static compilation, class loading occurs during the static compilation. As result, class loading does not occur when the program starts executing. Additionally, no just-intime compilation occurs. Thus, statically compilated programs can increase the performance in the execution of those programs.

Further, analysis and optimizations of the code in the program can occur with the static compilation. Garbage collection overhead can be reduced with static compilation. One manner in which garbage collection overhead can be reduced is to reduce the number of allocated objects in a heap. The heap is a region of memory allocated to store objects during the execution of the program. The heap is typically managed by a Java virtual machine and automatically sized if needed. Further, garbage collection can be performed to remove objects from the heap. By reducing the number of objects in the heap, the overhead needed to manage the heap can be reduced.

The illustrative examples can allocate selected objects in another area of memory that is off the heap. This type of region in the memory is referred to as an "off heap region" in the memory. The illustrative examples recognize and take account that the analysis of objects created by a program and the uses of the objects can be used to identify which objects can be managed in an off heap region in the memory. With the identification of appropriate candidate objects for off heap management, the program can be modified to create the object in an off heap region in the memory and to deallocate the object once the object is no longer used.

In the illustrative of examples, the memory management for objects can be in an environment such as a Java programming environment. With this example, three categories of objects are present. These categories include "no escape", "global escape", and "arg escape".

No escape objects are created within a method or function and the lifetime of these types of objects is the lifetime of the method or function creating the object. Once the method creating the object completes execution, the object is no longer accessible and can be collected using garbage collection. In the illustrative examples, the memory management of no escape objects can already be optimized using an optimization technique called stack allocation. With this technique, the object is allocated in the execution stack of the method creating the object. In this manner, this type of allocation can reduce the number of objects in a Java heap.

Global escape objects are objects that are created by a method or function stored as a global variable. These types of objects are not managed in the illustrative examples.

In the illustrative example, the objects of interest for memory management are arg escape objects. An arg escape object can have a lifetime beyond the method creating the arg escape object. The illustrative examples can manage this type of object. Thus, the illustrative embodiments provide a method, apparatus, and computer program product for managing memory for objects. In one illustrative example, number of processor units determine a creation of an object in response to the object is not being within a call chain and not being assigned to a global variable. The number of processor units determine a set of uses of the object in a program in response to the object not being within a call chain and not being assigned to a global variable. The number of processor units add an allocation program code to allocate the memory to the object in an off heap region in the memory. The number of processor units add a deallocation program code to deallocate the memory after each possible last use in a set of possible last uses of the object in the uses of the object in the program. This program code for the program with these modifications are then compiled for execution. In this manner, a static compilation of the program with these code modifications can have improved memory use as compared to other programs that are statically compiled or not statically compiled.

Figure 2:
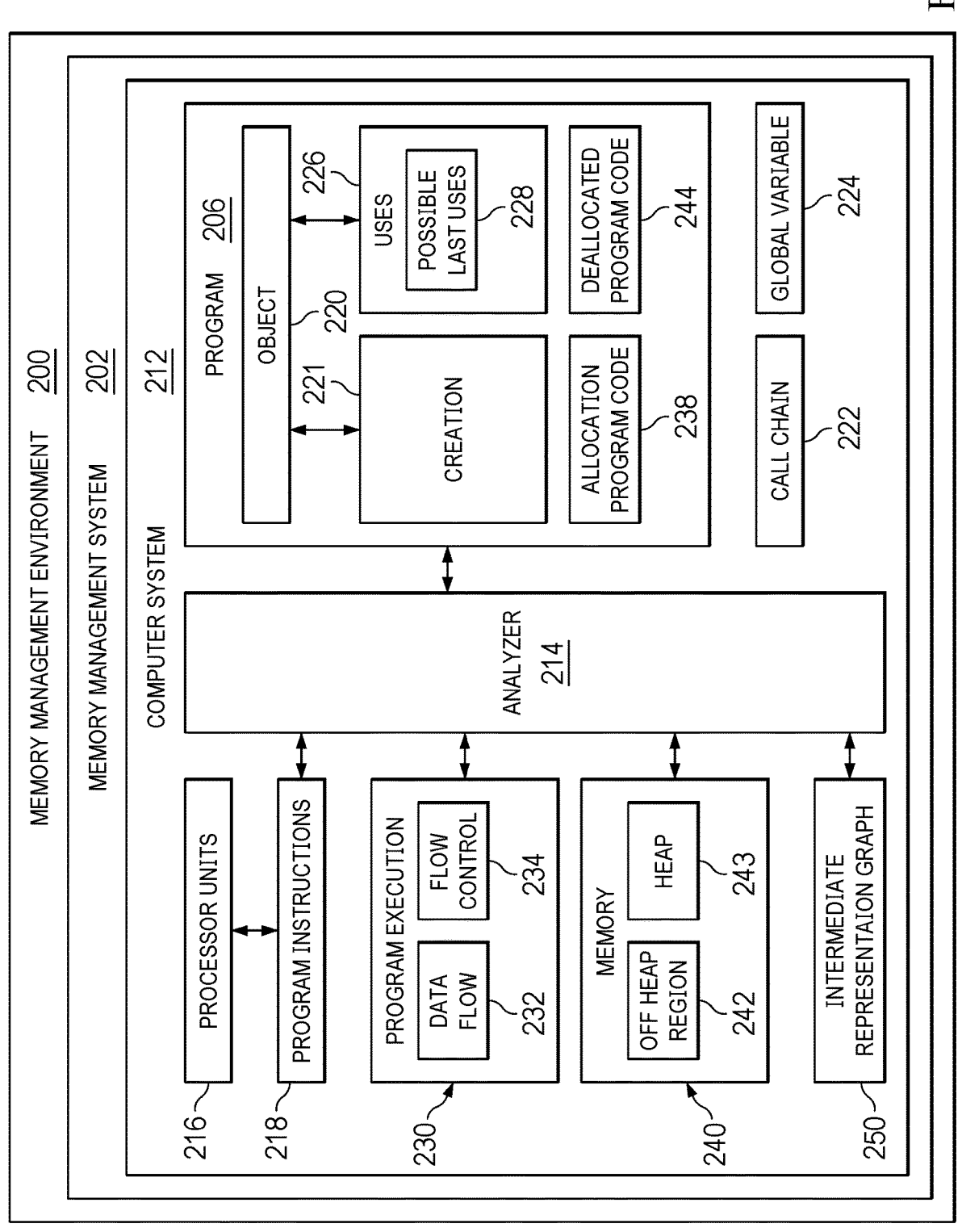
FIG. 2 is a block diagram of a memory management environment in accordance with an illustrative embodiment.

With reference now to FIG. 2, a block diagram of a memory management environment is depicted in accordance with an illustrative embodiment. In this illustrative example, memory management environment 200 includes components that can be implemented in hardware such as the hardware shown in computing environment 100 in FIG. 1.

In this illustrative example, memory management system 202 can analyze program code to optimize memory management of objects using garbage collection. Memory management system 202 can be used to reduce the garbage collection overhead through selective allocation of objects to off heap regions in memory 240.

In this illustrative example, memory management system 202 comprises a number of different components. As depicted, memory management system 202 comprises computer system 212 and analyzer 214. Analyzer 214 is located in computer system 212.

Analyzer 214 can be implemented in software, hardware, firmware or a combination thereof. When software is used, the operations performed by analyzer 214 can be implemented in program instructions configured to run on hardware, such as a processor unit. When firmware is used, the operations performed by analyzer 214 can be implemented in program instructions and data and stored in persistent memory to run on a processor unit. When hardware is employed, the hardware can include circuits that operate to perform the operations in analyzer 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, analyzer 214 can analyze program 206 to identify optimizations prior to performing static compilation of program 206. In this example, program 206 is a source program written in a high-level programming language. This high-level programming language can be, for example, Java or Python. This program code can then be compiled or interpreted into machine code for execution by processor is in a computer such as processor units 216 in computer system 212. In this example, static compilation can be performed after optimizing program 206.

In this example, analyzer 214 analyzes object 220 in program 206 to determine whether object 220 is suitable for optimization. As depicted, analyzer 214 analyzes program 204 to determine creation 221 of object 220 in program 206. Additionally, analyzer 214 determines a set of uses 226 of object 220 in program 206. Analyzer 214 can determine the set of uses 226 of object 220 in program 206 by analyzing program execution 230 of program 206.

As used herein, a "set of" when used with reference items means one or more items. For example, a set of uses is one or more uses.

In this illustrative example, analyzer 214 analyzes program 204 to determine whether creation 221 of object 220 and uses 226 of object 220 are within call chain 222. In this example, call chain 222 is a method call chain that starts from the definition creation of object 220. If the lifetime of object 220 is within call chain 222, object 220 is not a candidate for memory management in off heap region 242 of memory 240.

Analyzer 214 also determines whether object 220 is assigned to global variable 224. Further in this example, object 220 is not a candidate for memory management in off heap region 242 if object 220 is assigned to global variable 224.

In this illustrative example, analyzer 214 determines a set of possible last uses 228 of object 220 are identified. This determination of the set of possible last uses 228 in the set of uses 226 can be performed by analyzing program execution 230 of program 206. In this illustrative example, program execution 230 can include at least one of data flow 232 or control flow 234. In other words, the analysis of program execution 230 can include analyzing data flow 232, control flow 234, or both data flow 232 and control flow 234.

Data flow 232 can be used to focus on a particular object. For example, data flow 232 can be used to identify creation 221 and uses 226 in the program sequence for program 206. Control flow 234 can be used to determine the set of possible last uses 228. For example, control flow 234 can be used when branches or loops exist in program 206. Control flow 234 can be analyzed to check all possible program execution. In this manner, the set of possible last uses 228 can be determined. The analysis of data flow 232 and control flow 234 can be performed using currently available functions and compilers In some illustrative examples, analyzer 214 can perform the analysis for a selected period of time before terminating or halting. For example, analyzer 214 can halt determining creation 221 of object 220 in determining uses 226 of object 220 in program 206 that are not within call chain 222 in response to the time analyzing program 206 exceeding some threshold. For example, the threshold can be a compilation time for program 206 or some other period of time.

In this illustrative example, analyzer 214 adds allocation program code 238 to program 206 to allocate memory 240 to object 220 in off heap region 242 in memory 240 in response to object 220 not being within call chain 222 and not being assigned to global variable 224. In one illustrative example, allocation program code 238 can be added to an object definition for object 220.

Further in this example, analyzer 214 adds deallocation program code 244 to program 206 to deallocate memory 240 after each possible last use in the set of possible last uses 228 of object 220 in program 206 in which object 220 is not assigned to global variable 224 in response to object 220 not being within call chain 222 and not being assigned to global variable 224.

As a result, object 220 is not placed into heap 243 during execution of program 206. By managing object 220 and off heap region 242, the number of objects in the heap is reduced. As result, garbage collection overhead for the heap can be reduced through this management of object 220. This process described for object 220 can be performed for each object in program 206. Program 206 can then be statically compiled for execution with these modifications to program 206.

In one illustrative example, analysis of program 206 is performed using intermediate representation graph 250 for program 206. Intermediate representation graph 250 is a data structure representing program code in program 206 in a format that is between the source code for program 206 and the interpreted machine code. This form of the program code is easier for compilers and interpreters to analyze and optimize. Intermediate representation graph 250 for program 206 can be optimized to include allocation program code 238 and deallocation program code 244 and this optimize form of program 206 can be compiled to generate machine code as part of a static compilation to create an executable form of program 206.

In one illustrative example, analyzer 214 creates intermediate representation graph 250 for program 206. In determining creation 251 of object 220, analyzer 214 determines creation 221 of object 220 using intermediate representation graph 250 in response to object 220 not being within call chain 222 and not being assigned to global variable 224. Additionally, in determining the set of uses 226 of object 220, analyzer 214 determines the set of uses 226 of object 220 in program 206 using intermediate representation graph 250 in response to object 220 not being within call chain 222 and not being assigned to global variable 224.

In this illustrative example, program 206 can be a Java program with object 220 being a Java object. In other illustrative examples, analyzer 214 can be used to perform a similar analysis for program 206 that is written in other languages that involve objects that are managed in a heap in memory using garbage collection. For example, the illustrative examples can be applied to analyze and manage memory for objects in programming languages such as Python, JavaScript, C#, PHP, and other languages in which garbage collection is used to manage objects in a heap in memory.

In one illustrative example, one or more solutions are present that overcome a performance problem with overhead involved with managing objects in a heap during program execution. As a result, one or more solutions may provide an ability to reduce the overhead in performing garbage collection in a heap. The increase in performance can occur by reducing the number of objects present in a heap for garbage collection management. In these illustrative examples, the reduction in the number of objects managed can be achieved by moving selected objects to an off heap region for management. In the illustrative examples, these objects are objects that are not within a call chain and are not assigned to a global variable.

Computer system 212 can be configured to perform at least one of the steps, operations, or actions described in the different illustrative examples using software, hardware, firmware or a combination thereof. As a result, computer system 212 operates as a special purpose computer system in which analyzer 214 in computer system 212 enables analyzing a program to identify optimizations before performing static compilation of the program. In particular, analyzer 214 transforms computer system 212 into a special purpose computer system as compared to currently available general computer systems that do not have analyzer 214.

In the illustrative example, the use of analyzer 214 in computer system 212 integrates processes into a practical application for managing memory and in particular to managing objects in memory. A method determines a creation of an object in a program; determines a set of uses of the object in the program; adds an allocation program code to allocate the memory to the object in an off heap region in the memory in response to the object not being within a call chain and not being assigned to a global variable; and adds a deallocation program code to deallocate the memory after each possible last use in a set of possible last uses of the object in the uses of the object in the program in response to the object not being within the call chain and not being assigned to the global variable.

This process increases the performance of computer system 212 in executing program 206 as compared to other computers that do not use analyzer 214 to optimize program 206 for execution in a manner that reduces the overhead for a garbage collection process. In this illustrative example, analyzer 214 in computer system 212 can have additional steps that result in reducing the overhead for garbage collection processes managing objects in a heap.

The illustration of memory management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more objects can be present program 206 that can be analyzed and processed for management of off heap region 242 during execution program 206. As another illustrative example, the analysis of program execution 230 can be used with or without intermediate representation graph 250 for program 206.

Figure 3:
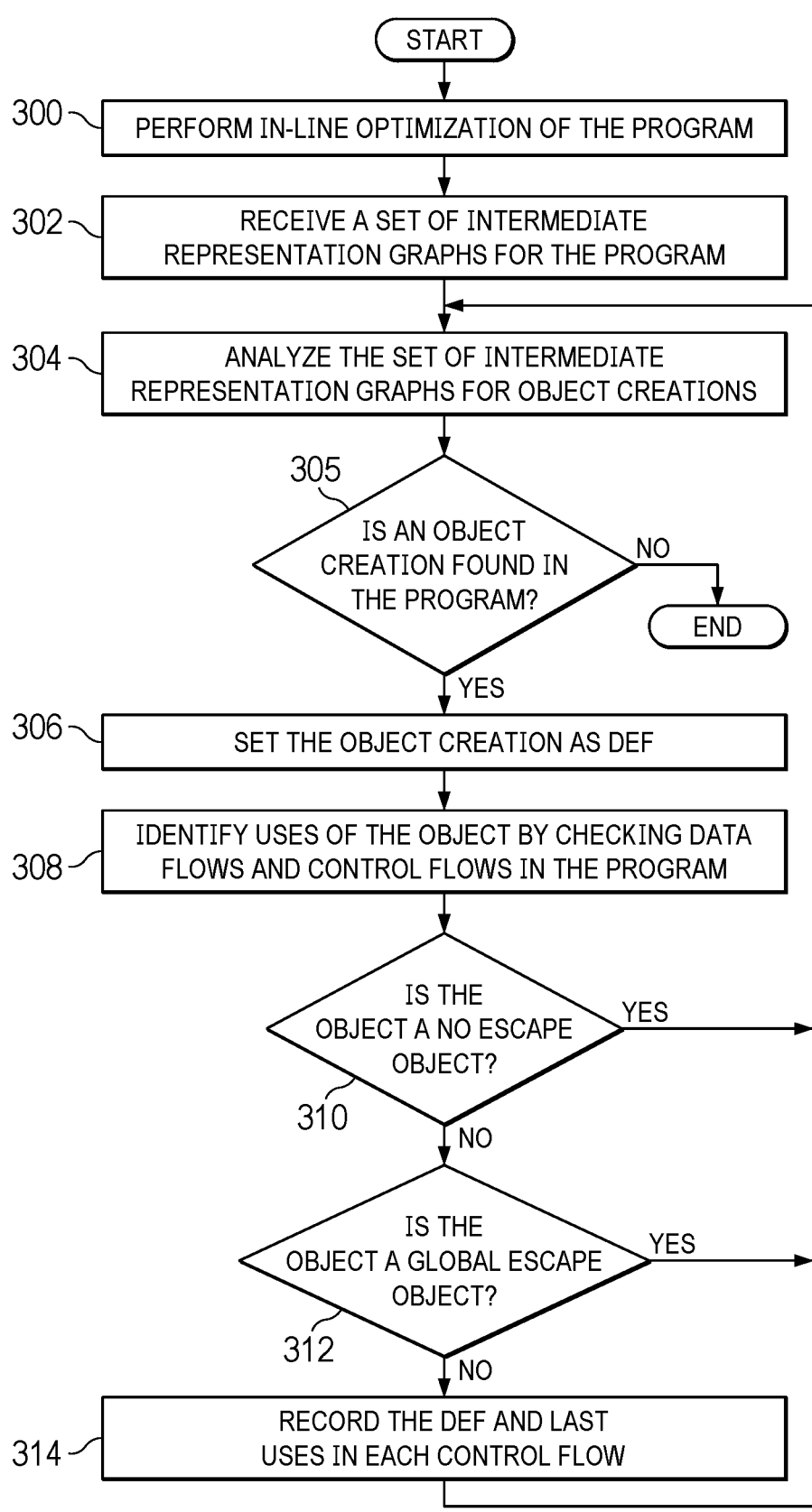
FIG. 3 is a flowchart of a process of analyzing program execution of the program in accordance with an illustrative embodiment.

Turning next to FIG. 3, a flowchart of a process of analyzing program execution of the program is depicted in accordance with an illustrative embodiment. The process in FIG. 3 can be implemented in hardware, software, or both. When implemented in software, the process can take the form of program instructions that are run by one of more processor units located in one or more hardware devices in one or more computer systems. For example, the process can be implemented in analyzer 214 in computer system 212 in FIG. 2. In this illustrative example, the program is a Java program.

The process begins by performing in-line optimization of the program (step 300). In-line optimization is a compiler optimization technique used in programming languages such as Java to improve the performance of the program. For example, with in-line optimization, a function call in the program can be replaced with the actual function itself.

The process receives a set of intermediate representation graphs for the program (step 302). The set of intermediate representation graphs are used in analyzing program in the subsequent steps.

The process analyzes the set of intermediate representation graphs for object creations (step 304). The process determines whether an object creation is found in the program (step 305). In response to identifying an object creation, the process sets the object creation as def (step 306). In step 306, "def" is short for definition. The process identifies uses of the object by checking data flows and control flows in the program (step 308).

A determination is made as to whether the object is a no escape object (step 310). In step 310, this determination can be made by determining whether any the object is within a method call chain starting from the def of the object to one of the last uses. In response to the object being a no escape object, the process returns to step 304. In this case, the object is known object of interest for optimization.

Otherwise, a determination is made as to whether the object is a global escape object (step 312). In step 312, this determination can be made by determining whether the object is assigned to a global variable. This type of object is known object for which optimization is performed in the illustrative examples. If the object is a global escape object, the process returns to step 304.

Otherwise, the process records the def and last uses in each control flow (step 314). In step 314, these last uses in each of the control flows form a set of possible last uses for the object. The process then returns to step 304. With reference again to step 305, if an object creations not found, the process terminates. In this case, no objects are present that have not already been analyzed.

Turning next to FIG. 4, a flowchart of a process for managing memory is depicted in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in analyzer 214 in computer system 212 in FIG. 2. In this illustrative example, the program is a Java program.

The process begins by determining a creation of an object in a program (step 400). The process determines a set of uses of the object in the program (step 402).

The process adds an allocation program code to allocate the memory to the object in an off heap region in the memory in response to the object not being within a call chain and not being assigned to a global variable (step 404). This allocation program code can be memory allocation functions such as "malloc". The process adds a deallocation program code to deallocate the memory after each possible last use in a set of possible last uses of the object in the uses of the object in the program in response to the object not being within the call chain and not being assigned to the global variable (step 406). In step 406, the deallocation program code can be a memory deallocation functions such as "free". The process terminates thereafter.

With reference to FIG. 5, a flowchart of a process for analyzing a program is depicted in accordance with an illustrative embodiment. This figure is an example of an additional step that can be performed in the process in FIG. 4 an example implementations for step 400 and step 402 in FIG. 4.

The process creates an intermediate representation graph for the program (step 500). The process determines the creation of the object using the intermediate representation graph (step 502). Step 502 is an example of an implementation for step 400 in FIG. 4.

The process determines the set of uses of the object in the program using the intermediate representation graph (step 504). The process terminates thereafter. In this example, step 504 is an example of an implementation for step 402 in FIG. 4.

With reference to FIG. 6, a flowchart of a process for determining whether an object is suitable for memory management is depicted in accordance with an illustrative embodiment. The process in this figure is an example of additional steps that can be performed with the process in FIG. 4.

The process begins by determining whether the creation of the object and the uses of the object are within the call chain (step 600). The process determines whether the object is assigned to the global variable (step 602). The process terminates thereafter.

In FIG. 7, a flowchart of process for determining uses for an object is depicted in accordance with an illustrative embodiment. The process illustrated in this figure is an example of an implementation for step 400 to FIG. 4.

The process analyzes a program execution of the program to determine the uses of the object in the program in response to the creation of the object and the uses of the object not being within the call chain and the object not being assigned to the global variable (step 700). The process terminates thereafter.

Turning next to FIG. 8, a flowchart of a process for determining a set of last possible uses for an object is depicted in accordance with an illustrative embodiment. The process in FIG. 8 is an example of an additional step that can be formed with the steps in FIG. 4.

The process determines the set of possible last uses of the object from the uses of the object in the program from analyzing a control flow for the program (step 800). The process terminates thereafter.

With reference now to FIG. 9, an illustration of a flowchart of a process for determining analysis of the program for memory management is depicted in accordance with an illustrative embodiment. The process illustrated in FIG. 9 is an example of an additional step that can be performed with the steps in FIG. 4.

The process determines the creation of the object and determine uses of the object in the program that are not within the call chain in which the object is not assigned to the global variable in response to time analyzing the program exceeding a compilation time for the program (step 900). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
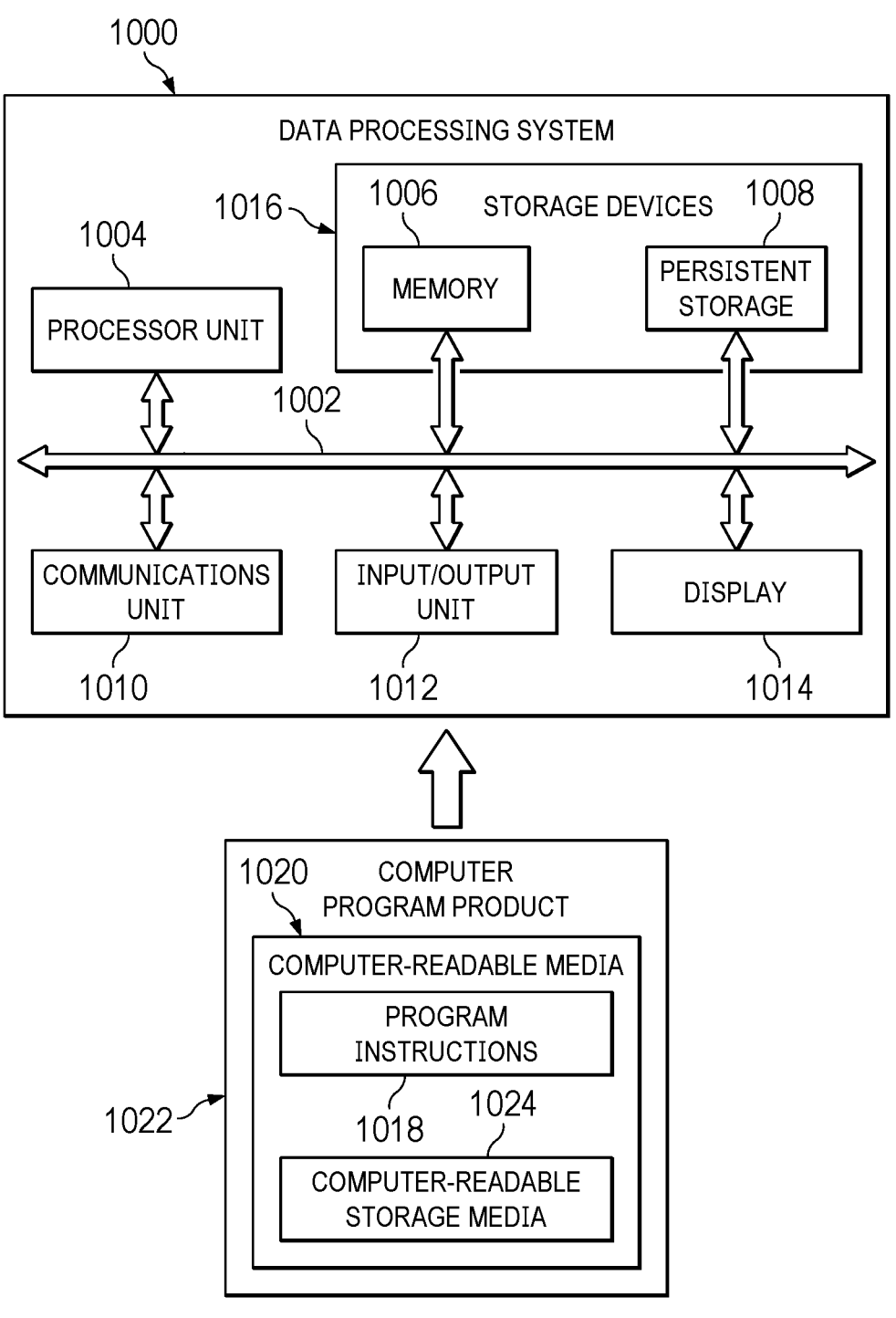
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement computers and computing devices in computing environment 100 in FIG. 1. Data processing system 1000 can also be used to implement computer system 212 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1016 may also be referred to as computer readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program instructions, computer usable program instructions, or computer readable program instructions that can be read and executed by a processor in processor unit 1004. The program instructions in the different embodiments can be embodied on different physical or computer readable storage media, such as memory 1006 or persistent storage 1008.

Program instructions 1018 are located in a functional form on computer readable media 1020 that is selectively removable and can be loaded onto or transferred to data processing system 1000 for execution by processor unit 1004. Program instructions 1018 and computer readable media 1020 form computer program product 1022 in these illustrative examples. In the illustrative example, computer readable media 1020 is computer readable storage media 1024.

Computer readable storage media 1024 is a physical or tangible storage device used to store program instructions 1018 rather than a medium that propagates or transmits program instructions 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer readable signal media. The computer readable signal media are signals and can be, for example, a propagated data signal containing program instructions 1018. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1020" can be singular or plural. For example, program instructions 1018 can be located in computer readable media 1020 in the form of a single storage device or system. In another example, program instructions 1018 can be located in computer readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer readable media 1020 in a server computer while another portion of program instructions 1018 can be located in computer readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Thus, illustrative embodiments of the present invention provide a computer implemented method, computer system, and computer program product for managing memory. In one illustrative example, a computer implemented method manages a memory. A number of processor units determine a creation of an object in a program. The number of processor units determine a set of uses of the object in the program. The number of processor units add an allocation program code to allocate the memory to the object in an off heap region in the memory in response to the object not being within a call chain and not being assigned to a global variable. The number of processor units add a deallocation program code to deallocate the memory after each possible last use in a set of possible last uses of the object in the uses of the object in the program in response to the object not being within the call chain and not being assigned to the global variable.

As result, a program can be optimized prior to static compilation. This optimization can reduce the number of objects managed during garbage collection in a heap. In these illustrative examples, the reduction in the number of objects managed and be achieved by moving selected objects to an off heap region for management.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing memory during compilation and execution of a program, the computer implemented method comprising:

determining, by a number of processor units, a creation of an object in the program;

determining, by the number of processor units, a set of uses of the object in the program;

analyzing, by the number of processor units, at least one of a data flow or control flow of the program;

determining, by the number of processor units, whether the object escapes a call chain and whether the object is assigned to a global variable;

in response to determining that the object does not escape the call chain and is not assigned to the global variable, modifying, by the number if processor units during compilation, the program to insert allocation program code that allocates memory for the object in an off heap region of memory; and modifying, by the number if processor units during compilation, the program to insert deallocation program code that deallocates the memory after each possible last use of the object determined from the set of uses;

compiling the modified program to generate an executable; and executing the executable such that the object is allocated in the off heap region and deallocated after the possible last use.

2. The computer implemented method of claim 1 further comprising:

creating, by the number of processor units, an intermediate representation graph for the program, wherein determining, by the number of processor units, the creation of the object comprises:

determining, by the number of processor units, the creation of the object using the intermediate representation graph; and wherein determining, by the number of processor units, the set of uses of the object comprises:

determining, by the number of processor units, the set of uses of the object in the program using the intermediate representation graph.

3. The computer implemented method of claim 1 further comprising:

determining, by the number of processor units, whether the creation of the object and the uses of the object are within the call chain; and determining, by the number of processor units, whether the object is assigned to the global variable.

4. The computer implemented method of claim 1, wherein determining, by the number of processor units, the set of uses further comprises:

analyzing, by the number of processor units, a program execution of the program to determine the uses of the object in the program in response to the creation of the object and the uses of the object not being within the call chain and the object not being assigned to the global variable.

5. The computer implemented method of claim 1 further comprising determining, by the number of processor units, the set of possible last uses of the object from the uses of the object in the program from analyzing a control flow for the program.

6. The computer implemented method of claim 1 further comprising:

halting, by the number of processor units, determining the creation of the object and determining uses of the object in the program that are not within the call chain in which the object is not assigned to the global variable in response to analysis time exceeding a compilation time limit for the program.

7. The computer implemented method of claim 1, wherein the program is a Java program and the object that is not in the call chain and not assigned to the global variable is a no escape object.

8. The computer implemented method of claim 1, wherein the allocation program code to allocate the memory to the object in the off heap region in the memory is added to at an object definition for the object.

9. A computer system for managing memory during compilation and execution of a program comprising:

a number of processor units, wherein the number of processor units executes program instructions to:

determine a creation of an object in the program;

determine a set of uses of the object in the program;

analyze at least one of a data flow or control flow of the program;

determine whether the object escapes a call chain and whether the object is assigned to a global variable;

in response to determining that the object does not escape the call chain and is not assigned to the global variable, modifying the program during compilation to insert allocation program code that allocates memory for the object in an off heap region of memory; and modify the program during compilation to insert deallocation program code that deallocates the memory after each possible last use of the object determined from the set of uses;

compiling the modified program to generate an executable; and executing the executable such that the object is allocated in the off heap region and deallocated after the possible last use.

10. The computer system of claim 9, wherein the number of processor units further executes the program instructions to:

create an intermediate representation graph for the program, wherein in determining the creation of the object comprises, the number of processor units further executes the program instructions to:

determine the creation of the object using the intermediate representation graph; and wherein determining the set of uses of the object comprises:

determine the set of uses of the object in the program using the intermediate representation graph.

11. The computer system of claim 9, wherein the number of processor units further executes the program instructions to:

determine whether the creation of the object and the uses of the object are within the call chain; and determine whether the object is assigned to the global variable.

12. The computer system of claim 9, wherein in determining the set of uses, the number of processor units further executes the program instructions to:

analyze a program execution of the program to determine the uses of the object in the program in response to the creation of the object and the uses of the object not being within the call chain and the object not being assigned to the global variable.

13. The computer system of claim 9, wherein the number of processor units further executes the program instructions to:

determine the set of possible last uses of the object from the uses of the object in the program from analyzing a control flow for the program.

14. The computer system of claim 9, wherein the number of processor units further executes the program instructions to:

halt the creation of the object and determining uses of the object in the program that are not within the call chain in which the object is not assigned to the global variable in response to time analyzing the program exceeding a compilation time for the program.

15. The computer system of claim 9, wherein the program is a Java program and the object that is not in the call chain and not assigned to the global variable is a no escape object.

16. The computer system of claim 9, wherein the allocation program code to allocate the memory to the object in the off heap region in the memory is added to at an object definition for the object.

17. A computer program product for managing memory during compilation and execution of a program, the computer program product comprising a computer readable storage medium having program instructions embodied therewith, the program instructions executable by a computer system to cause the computer system to:

determine a creation of an object in the program;

determine a set of uses of the object in the program;

analyze at least one of a data flow or control flow of the program;

determine whether the object escapes a call chain and whether the object is assigned to a global variable;

in response to determining that the object does not escape the call chain and is not assigned to the global variable, modifying the program during compilation to insert allocation program code that allocates memory for the object in an off heap region of the memory and modify the program during compilation to insert deallocation program code that deallocates the memory after each possible last use of the object determined from the set of uses;

compiling the modified program to generate an executable; and executing the executable such that the object is allocated in the off heap region and deallocated after the possible last use.

18. The computer program product of claim 17, wherein the program instructions are executable by the computer system to further cause the computer system to:

create an intermediate representation graph for the program, wherein determining the creation of the object comprises:

determine the creation of the object using the intermediate representation graph; and wherein determining the set of uses of the object comprises:

determine the set of uses of the object in the program using the intermediate representation graph.

19. The computer program product of claim 17, wherein the program instructions are executable by the computer system to further cause the computer system to:

determine whether the creation of the object and the uses of the object are within the call chain; and determine whether the object is assigned to the global variable.

20. The computer program product of claim 17, wherein the program instructions executable by the computer system to determine the set of uses further cause the computer system to:

analyze a program execution of the program to determine the uses of the object in the program in response to the creation of the object and the uses of the object not being within the call chain and the object not being assigned to the global variable.

* * * * *